United States Patent
Andersson et al.

[19]

[11] Patent Number: 6,038,153
[45] Date of Patent: Mar. 14, 2000

[54] INVERTER CIRCUIT FOR ILLUMINATING AN ELECTROLUMINESCENT LAMP

[75] Inventors: Hákan Andersson, Malmö; Johan Uggmark, Lund, both of Sweden

[73] Assignee: Telefonaktiebolaget LM Ericsson, Stockholm, Sweden

[21] Appl. No.: 08/871,522

[22] Filed: Jun. 9, 1997

[51] Int. Cl.$^7$ ................................................ H05B 33/08
[52] U.S. Cl. .............................. 363/97; 363/40; 363/56; 315/169.3; 315/209 R
[58] Field of Search ........................... 315/169.3, 209 R; 363/40, 55, 56, 95, 97, 131; 323/222, 223

[56] References Cited

U.S. PATENT DOCUMENTS

| | | | |
|---|---|---|---|
| 4,281,374 | 7/1981 | Archer | 363/41 |
| 4,319,164 | 3/1982 | Tulleners | 315/219 |
| 5,144,203 | 9/1992 | Fujita et al. | 315/169.3 |
| 5,313,141 | 5/1994 | Kimball | 315/169.3 |
| 5,502,357 | 3/1996 | Kimball | 315/209 R |
| 5,519,288 | 5/1996 | Tatsumi et al. | 315/169.3 |
| 5,539,707 | 7/1996 | Wood | 368/67 |
| 5,557,175 | 9/1996 | Wood | 315/169.3 |
| 5,686,797 | 11/1997 | Sanderson | 315/209 R |
| 5,789,870 | 8/1998 | Remson | 315/194 |

FOREIGN PATENT DOCUMENTS

| | | | |
|---|---|---|---|
| 0 508 337 | 10/1992 | European Pat. Off. | H05B 33/08 |
| 0 699 015 | 2/1996 | European Pat. Off. | H05B 33/08 |
| 0 704 834 | 4/1996 | European Pat. Off. | G09G 3/28 |
| 0 762 805 | 3/1997 | European Pat. Off. | H05B 33/08 |
| 0 782 373 | 7/1997 | European Pat. Off. | H05B 33/08 |
| 03176992 | 7/1991 | Japan | H05B 33/08 |
| 04048579 | 2/1992 | Japan | H05B 33/08 |
| 6-151056 | 5/1994 | Japan | H05B 33/08 |
| 9-22780 | 1/1997 | Japan | H05B 33/08 |

*Primary Examiner*—Peter S. Wong
*Assistant Examiner*—Bao Q. Vu
*Attorney, Agent, or Firm*—Burns, Doane, Swecker & Mathis, L.L.P.

[57] ABSTRACT

An inverter circuit (10) for driving an electroluminescent lamp (14) reduces humming noise by discharging the electroluminescent lamp (14) through a resistor circuit (32). A charging circuit (36 or 38) charges the electroluminescent lamp (14) to a first voltage level during a charge cycle. The electroluminescent lamp (14) is subsequently discharged to a second voltage level through the resistor circuit (32), which prolongs the transition from the first voltage level to the second voltage level, thereby reducing the humming noise components of the inverter circuit (10).

40 Claims, 6 Drawing Sheets

INVERTER CIRCUIT FOR ILLUMINATING AN ELECTROLUMINESCENT LAMP

BACKGROUND OF THE INVENTION

This invention generally relates to the field of inverter circuits and, more particularly, to inverter circuits that illuminate electroluminescent lamps.

Because of their compact size and low current consumption, electroluminescent lamps are widely used in small electronic devices. For example, such lamps are used for backlighting liquid crystal displays in portable communication devices, such as cellular telephones. Essentially, an electroluminescent lamp is a capacitor with a phosphorous dielectric. The lamp emits light when it is excited by applying a sufficiently high AC voltage across its electrodes. To emit light continuously, the lamp must be charged and discharged at a low frequency during successive charge and discharge cycles. For this reason, the drive signal for the electroluminescent lamp is a high-voltage, low-frequency AC drive signal. Depending on the size of the electroluminescent lamp and the desired illumination intensity, this signal can have a voltage level in the range of 100–150 volts and a frequency in the range of 100–400 Hz.

Generally, a DC power supply generating a DC supply voltage in the range of 1–5 volts powers the electronic device in which the electroluminescent lamp is used. Such a voltage is significantly lower than the voltage level required to illuminate the lamp. Therefore, an electronic device that uses electroluminescent lamp typically includes an inverter circuit which converts the low DC supply voltage to a high-voltage, low-frequency AC drive signal.

Various types of inverter circuits have been used in the past to convert a DC supply voltage to an AC drive signal. One known inverter circuit uses a transformer; transformers, however, are bulky and expensive, and thus are not suited for use in small electronic devices. Bridge inverter circuits, which include a DC diagonal and an AC diagonal, have also been used for driving electroluminescent lamps. In a bridge inverter circuit, a DC diagonal couples to the DC power supply, and an AC diagonal couples across the electroluminescent lamp. The diagonals increase the DC supply voltage and provide an alternating current to the electroluminescent lamp. The bridge inverter circuit further includes level shifters for operating a set of high-side switches. These level shifters add significantly to the cost and complexity of the electronic device.

Another conventional approach uses an inverter pump circuit in which the energy stored in an inductor is switched at high speed to produce a series of high voltage pulses. These pulses successively charge the electroluminescent lamp to a sufficiently high voltage level during a charge cycle. One of the advantages offered by such an inverter circuit is that by increasing the switching frequency, the size of the inductor can be reduced, thereby reducing the size of the inverter circuit. During a discharge cycle, the electroluminescent lamp is discharged through a short circuit. The short circuit is coupled across the lamp during the discharge cycle by closing a switch which is open during the charge cycle. By closing and opening the switch at a low frequency, the inverter pump circuit produces a low-frequency AC drive signal across the electroluminescent lamp. Generally, a control logic controls the switch during the charge and discharge cycles.

During the discharge cycle, however, a conventional inverter pump circuit produces humming noise components that are irritating to the human ear. More specifically, during the discharge cycles, the AC drive signal produced by this type of inverter circuit has steep voltage transitions, which are caused by the sudden discharge of the electroluminescent lamp through the short circuit. These sudden discharges produce various undesired frequency components, including the undesired humming noise components. Therefore, there exists a need for a simple and inexpensive inverter circuit for illuminating electroluminescent lamps in small electronic devices, which does not produce the irritating humming noise components.

SUMMARY OF THE INVENTION

Briefly, the present invention addresses this need, and provides other advantages, in an inverter circuit which discharges the electroluminescent lamp through a discharge circuit. The inverter circuit, which illuminates the electroluminescent lamp during repetitive illumination cycles, includes a DC power supply coupled to a charge circuit for charging the electroluminescent lamp to a first voltage level during a charge cycle. Subsequently, the discharge circuit, which includes a resistor circuit, discharges the electroluminescent lamp to a second voltage level during a discharge cycle. The damping discharge circuit dampens the transition from the first voltage level to the second voltage level, avoiding the steep transition that produces humming noise components.

In an exemplary embodiment of the present invention, an illumination cycle includes a positive charge cycle followed by a discharge cycle. Alternatively, the illumination cycle includes a negative charge cycle followed by a discharge cycle. When the illumination cycle includes a positive charge cycle, the charge circuit charges the electroluminescent lamp to a voltage level that is positive with respect to an initial level. When the illumination cycle includes a negative charge cycle, the charge circuit charges the electroluminescent lamp to a voltage level that is negative with respect to the initial level. During a discharge cycle, the damping discharge circuit discharges the electroluminescent lamp either from the positive voltage level or the negative voltage level to the initial level.

In one of the more detailed features of the invention, the charge circuit includes an inductor and a charge switch. By connecting and disconnecting the inductor to the DC power supply at a high frequency via the charge switch, the charge circuit charges the electroluminescent lamp to a high voltage level. The discharge circuit includes a discharge switch that connects the electroluminescent lamp circuit to the resistor during the discharge cycle, to discharge the electroluminescent lamp with a damped discharge transition. The charge switch and the discharge switch may be controlled by a pulse width modulator to provide a suitably shaped drive signal across the electroluminescent lamp.

Other features and advantages of the present invention will become apparent from the following description of the preferred embodiments, taken in conjunction with the accompanying drawings, which illustrate, by way of example, the principles of the invention.

DETAILED DESCRIPTION OF THE PREFERRED EMBODIMENTS

Figure 1:
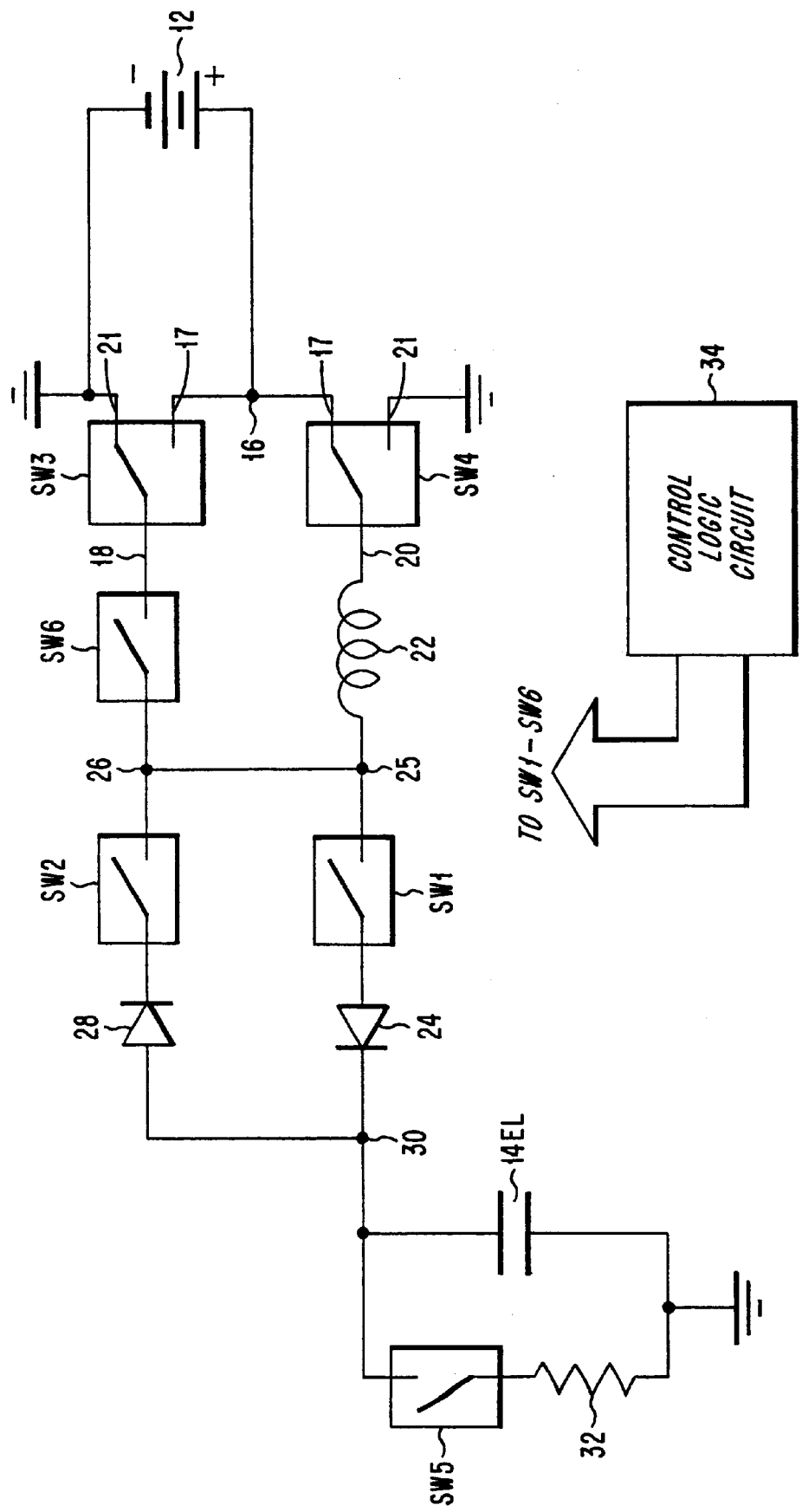
FIG. 1 shows a schematic diagram of an inverter circuit according to one embodiment of the present invention.

With reference to FIG. 1, an inverter circuit according to one embodiment of the present invention is coupled between a DC power supply 12 that provides a DC supply voltage to an electroluminescent lamp 14. In an exemplary embodiment of the invention, the inverter circuit is incorporated in a portable communication device, such as a cellular telephone, for producing an AC drive signal for illuminating the electroluminescent lamp 14, which is used for backlighting the device's LCD display. As shown, the positive terminal of the DC power supply 12 is coupled at a common junction 16 to non-common terminals 17 of two serially connected single-pole switches SW3 and SW4. The switches SW3 and SW4 each have a common terminal (18 and 20) and two non-common terminals (17 and 21). The other non-common terminals 21 of the switches SW3 and SW4 as well as the negative terminal of the DC power supply 12 are coupled to ground. Under this arrangement, the switches SW3 and SW4 connect their respective common terminals 18 or 20 to ground in one switching state and to the DC supply voltage in another switching state.

An inductor 22, which has one terminal coupled to the common terminal 20 of the switch SW4. The other terminal of the inductor 22 is coupled to the anode of a diode 24 via a single-throw switch SW1. This way, forward current flows through the diode 24 when the switch SW1 is closed. At a common junction 25, the inductor 22 and the switch SW1 connect to each other. At another common junction 26, which is connected to the common junction 25, the terminals of two serially coupled single-throw switches SW6 and SW2 are connected to each other. As shown, the other terminal of the switches SW2 of the switch SW6 is connected to the cathode of a diode 28, and the other terminal to the common terminal 18 of the switch SW3. The anode of diode 24 and the cathode of diode 28 are coupled at a common junction 30 to one electrode of the electroluminescent lamp 14. The other electrode of lamp 14 is coupled to ground.

According to this embodiment of the present invention, the inverter circuitry charges the electroluminescent lamp 14 to a first voltage level during a charge cycle. During a subsequent discharge cycle, the electroluminescent lamp 14 is discharged to a second voltage level through a damping discharge circuit in the form of a resistor 32. Discharging the electroluminescent lamp 14 through the damping discharge circuit according to the present invention dampens the transition from the first voltage level to the second voltage level, thereby significantly reducing the undesired humming noise components. As shown in FIG. 1, the closing of switch SW5 couples the resistor 32 across the electroluminescent lamp 14. When coupled, the resistor 32 dampens the transition from the first voltage level to the second voltage level. A control logic circuit 34 is programmed to provide the control signals for controlling the switching states of the switches SW1–SW6 during the charge and discharge cycles according to the present invention.

Figure 2:
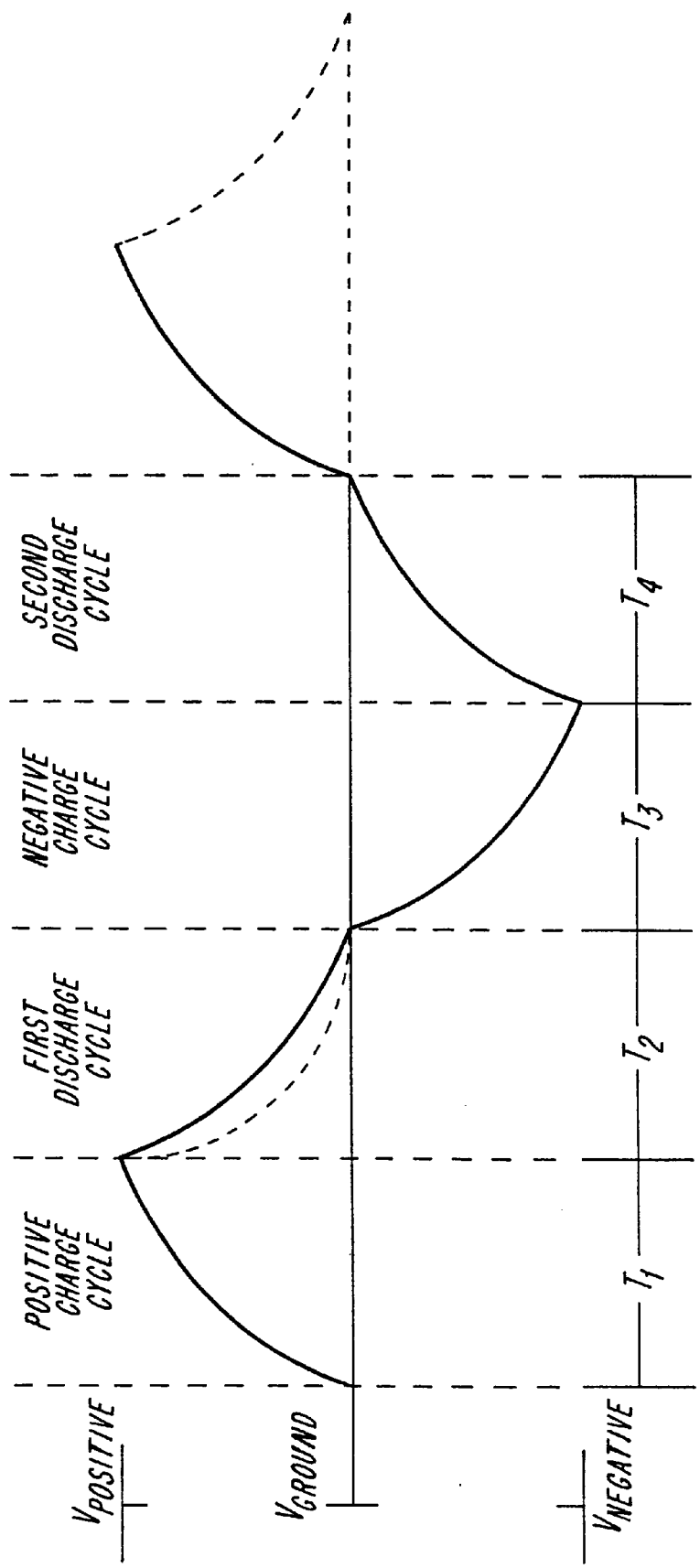
FIG. 2 shows a timing diagram of an AC drive signal produced by the inverter circuit of FIG. 1.

With reference to FIG. 2, a timing diagram of the drive signal across the electroluminescent lamp 14 is shown. FIG. 2 shows the charge and discharge cycles that occur during a single illumination cycle. In this exemplary embodiment of the invention, each illumination cycle includes two charge and two discharge cycles occurring within corresponding time periods T1–T4. The electroluminescent lamp 14 remains illuminated for as long as the illumination cycles similar to the one shown in FIG. 2 are repeated.

During a positive charge cycle that takes place within the T1 time period, the drive signal varies from an initial ground potential $V_{ground}$ to a positive voltage level $V_{positive}$. As explained later in detail, the drive signal reaches the positive voltage level $V_{positive}$ by incremental charging of the electroluminescent lamp 14 with positive charge current as provided by the inductor 22.

Subsequently, during a first discharge cycle that takes place within the T2 time period, the drive signal transitions from the positive voltage level $V_{positive}$ to the ground potential $V_{ground}$ again. During the first discharge cycle, the resistor 32 is coupled across the electroluminescent lamp 14, to dampen the discharge cycle and to prolong the transition from the positive voltage level $V_{positive}$ to the ground potential $V_{ground}$. By discharging the electroluminescent lamp 14 through a damping discharge circuit instead of a conventional short circuit, the present invention substantially reduces undesired humming noise components. By comparison, a dotted line within the T2 time period shows an exemplary steep transition that may be caused by discharging the electroluminescent lamp through a conventional short circuit.

During a negative charge cycle following the first charge cycle, within the T3 time period, the drive signal transitions from the ground potential $V_{ground}$ to a negative voltage level $V_{negative}$. During the negative charge cycle, the direction of the charge current across the inductor 22 reverses. This charges the electroluminescent lamp to the negative voltage level $V_{negative}$, which has an absolute potential level substantially equal to the absolute potential level of the positive voltage level $V_{positive}$. Finally, one illumination cycle is completed during a second discharge cycle that takes place within the T4 time period. During this period, the drive signal transitions form the negative voltage level $V_{negative}$ to the ground potential $V_{ground}$. This is accomplished by closing the switch SW5 to couple the resistor 32 across the electroluminescent lamp 14, thereby dampening the discharge transition again.

The inverter circuit produces the drive signal shown in FIG. 2 by suitable operation of the switches SW1–SW6. During each one of the time periods T1–T4, the switches SW1–SW6 are placed in different switching states, to generate corresponding voltage transitions. Table 1 below shows four switching states that correspond to each one of the time periods T1–T4.

TABLE 1

|    | SW1    | SW2  | SW3        | SW4        | SW5    | SW6  |
|----|--------|------|------------|------------|--------|------|
| T1 | CLOSED | OPEN | $V_{GND}$  | $V_{DC}$   | OPEN   | OSC  |
| T2 | X      | OPEN | X          | X          | CLOSED | OPEN |

TABLE 1-continued

| | SW1 | SW2 | SW3 | SW4 | SW5 | SW6 |
|---|---|---|---|---|---|---|
| T3 | OPEN | CLOSED | $V_{DC}$ | $V_{GND}$ | OPEN | OSC |
| T4 | OPEN | X | X | X | CLOSED | OPEN |

X: DON'T CARE

According to Table 1, the control logic circuit 34 places the switches SW1–SW6 in a first switching state during the T1 time period, by closing the switch SW1, opening switches SW2 and SW5, and connecting the common terminals 18 and 20 of the switches SW3 and SW4 to ground and to the DC supply voltage, respectively. Also, the control logic 34 generates the control signal for opening and closing the switch SW6 at a high frequency during the T1 time period.

Figure 3A:
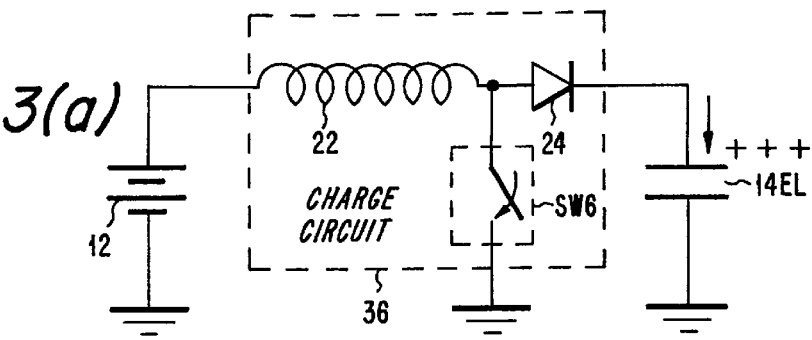
FIGS. 3($a$)–3($d$) show equivalent circuit diagrams of the inverter circuit of FIG. 1 during various time periods, T1 through T4, of the timing diagram of FIG. 2.

FIG. 3(a) shows an equivalent circuit diagram of the inverter circuit 10 during the T1 time period, when the switches SW1–SW6 are in the first switching state. When the switch SW6 is opened and closed at a high frequency, the inductor 22 produces a series of high voltage pulses, which successively charge the electroluminescent lamp 14 to the positive voltage level $V_{positive}$. More specifically, when the switch SW6 is closed, the inductor 22 stores the charge current, which is supplied by the DC power supply 12. Subsequently, when the switch SW6 opens, the electrical field on the inductor 22 collapses, directing the charge current stored in the inductor 22 to the electroluminescent lamp 14, through the forward biased diode 24. As a result, the inductor 22 charges the upper electrode of the electroluminescent lamp 14 to a positive voltage level relative to ground. As the process of opening and closing the switch SW6 continues at high frequency, the electroluminescent lamp 14 incrementally charges until it reaches the positive voltage level $V_{positive}$. Accordingly, the inductor 22, the switch SW6 and the diode constitute a charge circuit 36 that positively charges the electroluminescent lamp 14 during the positive charge cycle. As shown in FIG. 2, during the positive charge cycle, the drive signal rises to a voltage level that is positive with respect to its initial level.

According to Table 1, the control logic 34 places the switches SW1–SW6 in a second switching state during the T2 time period, by opening the switches SW2 and SW6 and closing the switch SW5. As indicated by the reference letters X in Table 1, the switching states of the remaining switches SW1 and SW3 and SW4 are "don't care." That is, these switches may either be open or closed without influencing the drive signal.

Figure 3B:
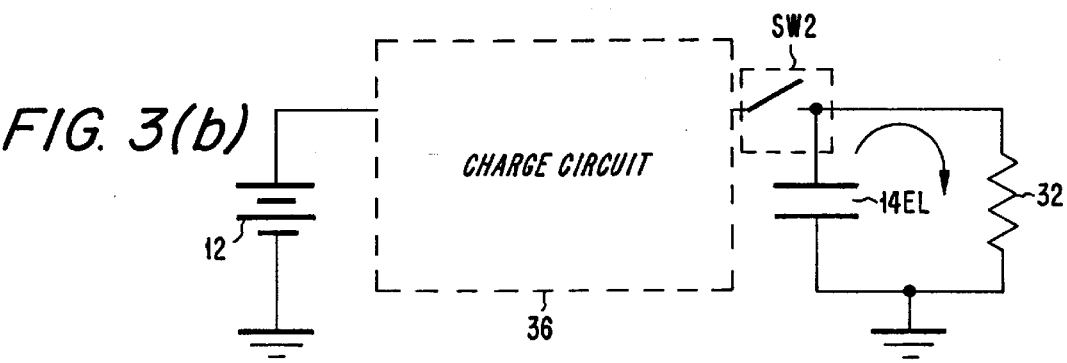

FIG. 3(b) shows the equivalent circuit diagram of the inverter circuit 10 under the second switching state. Under this switching state, the electroluminescent lamp 14 is isolated from the charging circuit 36 and the resistor 32 is coupled across the lamp 14. Consequently, the electroluminescent lamp 14 discharges through the resistor 32 during the T2 time period until it reaches the ground potential level $V_{ground}$. As explained before, the discharge of the electroluminescent lamp 14 through the resistor 32 prolongs the transition from the positive voltage level $V_{positive}$ to the ground potential level $V_{ground}$, thus minimizing the undesired humming noise components that are created when such a transition occurs through a short circuit.

The value of the resistor 32 is selected to create a suitable RC time constant for the equivalent damping discharge circuit under this switching state. For example, assuming the electroluminescent lamp 14 has a capacitance of 15 nf, a 38 K Ohm resistor 32 produces a 150 Hz frequency for a transition from 100 volts to 5 volts.

FIG. 2 shows the drive signal across the electroluminescent lamp 14 making a prolonged transition from the positive voltage level $V_{positive}$ to the ground potential level $V_{ground}$ within the T2 time period. Accordingly, the resistor 32, which is coupled across the electroluminescent lamp 14 during this time period, constitutes a damping discharge circuit that discharges the electroluminescent lamp 14 during first discharge cycle. As shown, during this discharge cycle, the drive signal transitions from a more positive voltage level to the ground potential level $V_{ground}$.

According to Table 1, during the T3 time period, the control logic 34 places the switches SW1–SW6 in a third switching state by opening the switches SW1 and SW5, closing the switch SW2, and connecting the common terminals 18 and 20 of the switches SW3 and SW4 to the supply voltage and the ground potential, respectively. Also, the control logic 34 generates a high frequency switch control signal during the T3 time period, for opening and closing the switch SW6 at a high frequency.

Figure 3C:
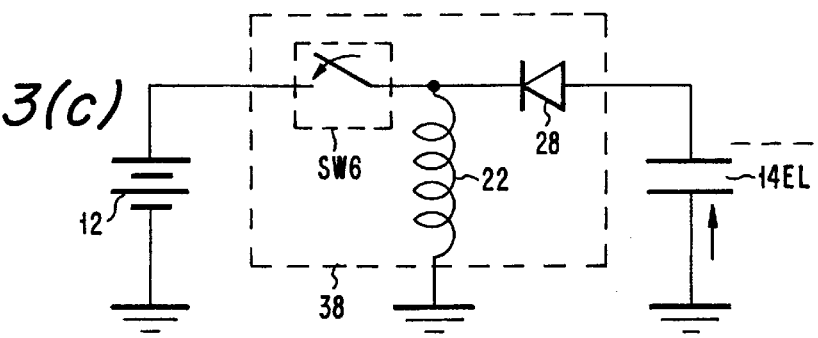

With reference to FIG. 3(c), the equivalent circuit diagram of the inverter circuit 10 under the third switching state is shown. Similar to the T1 time period, the high switching frequency of the switch SW6 during the T3 time period charges the electroluminescent lamp 14 to the negative voltage level $V_{negative}$, which has a substantially equal level, but opposite polarity relative to the positive voltage level $V_{positive}$. When the switch SW6 is closed, the inductor 22 stores the charge current supplied by the DC power supply 12. When the switch SW6 is opened, the collapsing electrical field directs the current stored in the inductor 22 to the electroluminescent lamp 14 through ground. As a result, the inductor 22 charges the lower electrode of the electroluminescent lamp 14, causing the voltage across the lamp to be negative relative to ground. As the process of opening and closing the switch SW6 continues at high frequency, the electroluminescent lamp 14 incrementally charges until it reaches the negative voltage level $V_{negative}$. Accordingly, the inductor 22, the switch SW6 and the diode 28 constitute a charge circuit 38 (shown in FIG. 3(c)) that negatively charges the electroluminescent lamp 14 during the negative charge cycle. As shown in FIG. 2, during this charge cycle, the drive signal falls to a potential level that is negative with respect to the initial potential level.

Figure 3D:
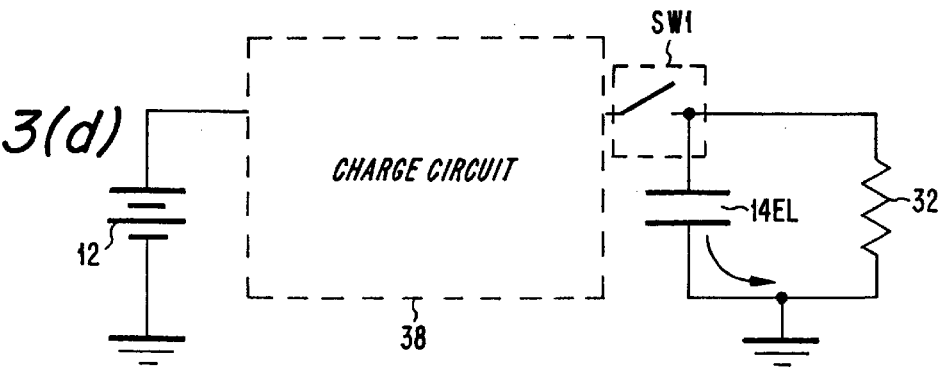

Finally, during the T4 time period, the control logic circuit 34 places the switches SW1–SW6 in a fourth switching state by opening the switches SW1 and SW6 and closing the switch SW5. The switching state of the remaining switches SW2 and SW3 and SW4 are don't care. FIG. 3(d) shows the equivalent circuit diagram of the inverter circuit of FIG. 1 under the fourth switching state, which is substantially similar to the equivalent circuit shown in FIG. 3(b). Similar to the second switching state, the electroluminescent lamp 14 becomes isolated from the charging circuit 38 and discharges through the resistance 32, to prolong the transition from the negative voltage level $V_{negative}$ to the ground potential level $V_{ground}$.

Accordingly, the resistance 32, which is coupled across the electroluminescent lamp 14 during the T4 time period, constitutes a discharge circuit that discharges the electroluminescent lamp 14 during the second discharge cycle. As shown in FIG. 2, the drive signal across the electroluminescent lamp 14 during the T4 time period makes a prolonged transition from a negative voltage level $V_{negative}$ to the ground potential level $V_{ground}$.

Figure 4:
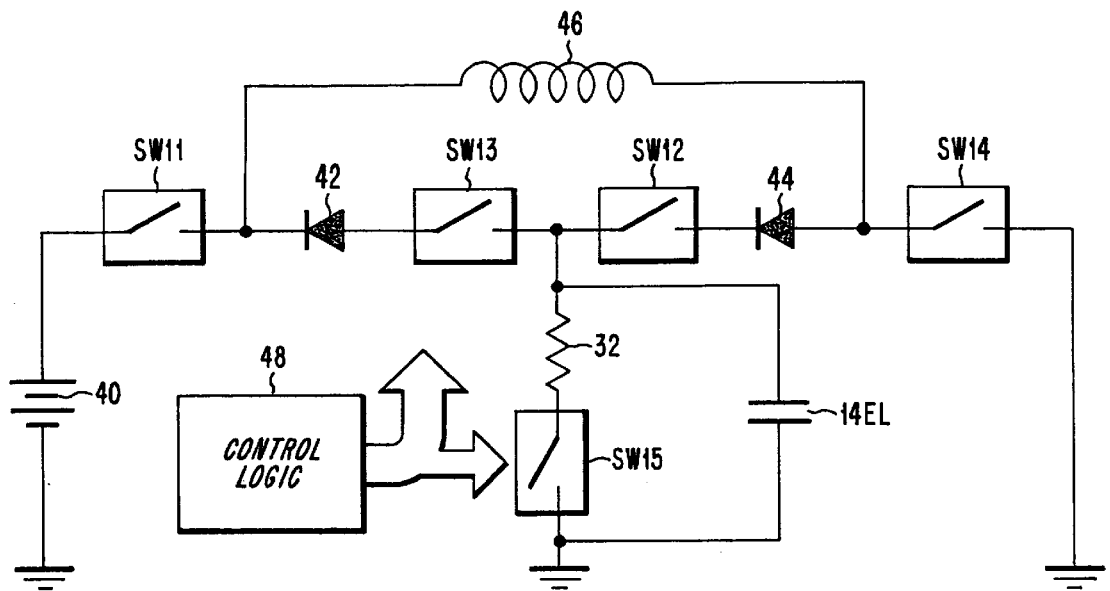
FIG. 4 shows a schematic diagram of an inverter circuit according to another embodiment of the present invention.

With reference to FIG. 4 another embodiment of an inverter circuit according to the present invention includes a power supply 40, switches SW11–SW15, diodes 42 and 44, an inductor 46, the electroluminescent lamp 14, and the damping resistor 32 that are interconnected with each other as shown. A control logic circuit 48 similar to the control logic circuit 34 of FIG. 1 controls the switching states of the switches SW11–15, according to TABLE 2 shown below.

TABLE 2

|    | SW11   | SW12   | SW13   | SW14   | SW15  |
|----|--------|--------|--------|--------|-------|
| T1 | CLOSED | CLOSED | OPEN   | OSC    | OPEN  |
| T2 | CLOSED | X      | OPEN   | OPEN   | OSC   |
| T3 | OSC    | OPEN   | CLOSED | CLOSED | OPEN  |
| T4 | OPEN   | OPEN   | X      | CLOSED | OSC   |

X: DON'T CARE

In a first switching state during T1 time period, the control logic circuit 48 closes switches SW11 and SW12, while opening switches SW13 and SW14. By opening and closing the switch SW14 at high frequency, the inverter circuit incrementally increases the voltage across the electroluminescent lamp to the positive voltage level $V_{positive}$ through the inductor 46 and the diode 44. In a second switching state during the T2 time period, the control logic circuit 48 opens the switch SW13 and oscillates the switch SW15, to couple the resistor 32 across the electroluminescent lamp 14. In this way, the electroluminescent lamp is discharged in a prolonged manner through the resistor 32. According to the present invention, discharging the electroluminescent lamp 14 through the resistor 32 dampens the transition from the $V_{positive}$ to $V_{ground}$ to reduce undesired humming noise.

In a third switching state during the T3 time period, the control logic circuit 48 closes switches SW13 and SW14, while opening switches SW12 and SW15. Again, the inverter circuit incrementally increases the voltage across the electroluminescent lamp through the inductor 46 and the diode 42 by opening and closing the switch SW11 at high frequency, to charge the electroluminescent lamp to the negative voltage level $V_{negative}$. Finally, in a fourth switching state during the T4 time period, the control logic circuit 48 oscillates the switch SW15 to couple the resistor 32 across the electroluminescent lamp 14, to discharge the electroluminescent lamp 14 through the resistor 32, which dampens the transition from the from the $V_{negative}$ to $V_{ground}$ Repeating the process of charging the switching states of the switches SW11–SW15 according to TABLE 2 produces a drive signal across the electroluminescent lamp substantially similar to the wave form shown in FIG. 2.

Figure 5:
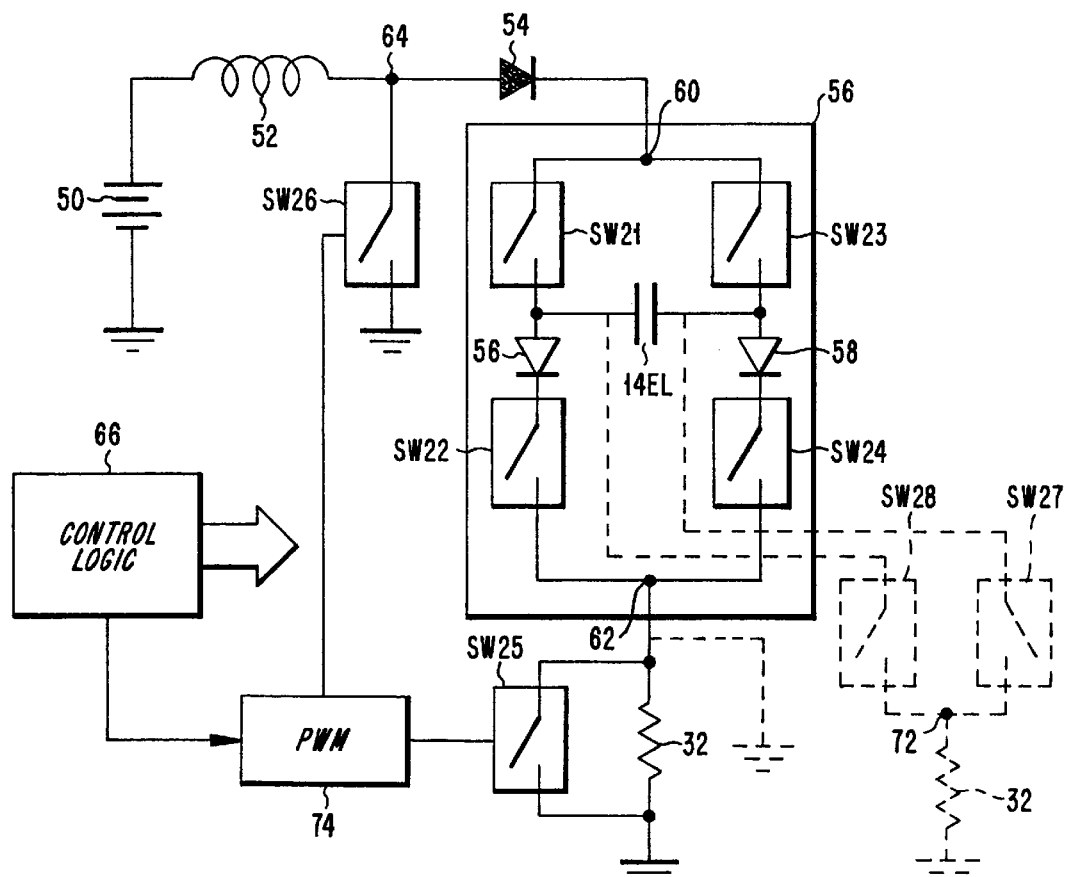
FIG. 5 shows a schematic diagram of an inverter circuit according to yet another embodiment of the present invention.

With reference to FIG. 5, yet another embodiment of an inverter circuit is shown. Unlike the inverter circuits of FIG. 1 and FIG. 4, the inverter circuit of FIG. 5 alters the charge on the electrodes of the electroluminescent lamp. According to this aspect of the present invention, the inverter circuit of FIG. 5 is configured to include the charging inductor in the discharge loop of the electroluminescent lamp 14 to further dampens the discharge transitions. By forming a discharge loop that includes the charging inductor in series with the damping resistor, this embodiment of the inverter circuit produces a substantially linear drive signal across the electroluminescent lamp 14. Applying a substantially linear drive signal across the electroluminescent lamp 14 significantly extends its operating live.

According to this embodiment, the inverter circuit of FIG. 5 includes a power supply 50 for supplying a supply voltage that charges the electroluminescent lamp 14 through an inductor 52 and a diode 54. The supply voltage charges the electroluminescent lamp 14 using an H-bridge circuit 56 that includes two parallel branches and a center branch. One branch of the H-bridge circuit 56 includes a switch SW21, a diode 56 and a switch SW22, which are serially coupled to each other as shown. Similarly, the other branch of the H-bridge includes a switch SW23, a diode 58 and a switch SW 24, which are also serially coupled to each other. At the center branch, the electroluminescent lamp 14 couples the cathodes of the diodes 56 and 58 to each other. At a common node 60, one of the terminals of each one of the switches SW21 and SW23 are coupled to the anode of the diode 54. At another common node 62, one of the terminals of the damping resistor 32 is coupled to terminals of the switches 22 and 24, as shown. A switch SW25 is coupled across the resistor 32, which is grounded at its other terminal. A high frequency switch SW26 coupled between ground and a common node 64 that connect the inductor 52 and the diode 64 to each other is used for providing the charge current inductor charges into the electroluminescent lamp 14. A control logic circuit 66 controls the operation of this embodiment of the inverter circuit according to Table 3.

TABLE 3

|    | SW21   | SW22   | SW23   | SW24   | SW25   | SW26  |
|----|--------|--------|--------|--------|--------|-------|
| T1 | CLOSED | OPEN   | OPEN   | CLOSED | CLOSED | OSC   |
| T2 | OPEN   | CLOSED | CLOSED | OPEN   | OSC    | OPEN  |
| T3 | OPEN   | CLOSED | CLOSED | OPEN   | CLOSED | OSC   |
| T4 | CLOSED | OPEN   | OPEN   | CLOSED | OSC    | OPEN  |

Operationally, in one switching state during a T1 time period, the switch 26 is opened and closed at high frequency to charge one of the electrodes of the electroluminescent lamp 14 via the inductor 52, the diode 54 and the switch SW21. During this time period, the switch SW25 and SW21 are closed and SW22 and SW23 are open. This arrangement creates a short across the damping resistor 32. The short couples the other electrode of the electroluminescent 14 to ground, which allows the electroluminescent lamp 14 to be charged to a positive level voltage $V_{positive}$.

During a T2 time period, the charged electrode of the electroluminescent lamp 14 is discharged through the damping resistor 32 by oscillating the switch SW25 and closing the switches SW22 and SW23. According to this arrangement, the inductor 52 is included in the discharge loop of the electroluminescent lamp 14 during the discharge cycle. The inclusion of the inductor 52, which is resistive to sudden current changes caused by discharging the electroluminescent lamp, in the discharge loop further dampens the discharge transition, to improve the undesired humming noise components generated during the discharge cycle. It may be appreciated that through a suitable circuit and switching arrangements the charging inductor may also be included in the discharge loop of the inverter circuits of FIG. 1 and FIG. 4. During this discharge cycle, the voltage across the electroluminescent lamp is discharged to the ground potential $V_{ground}$.

During a T3 time period, the inverter circuit of FIG. 5 charges the other electrode of the electroluminescent lamp 14 to a positive voltage level $V_{positive}$ through the inductor 52 and the diode 54 by closing switches SW22, SW23 and SW25 and opening and closing the switch SW26 at high frequency. During this charge cycle, the electroluminescent lamp 14 is charged to the positive voltage level $V_{positive}$ again. Thereafter, by closing switches SW21 and SW24 opening switches SW22, SW23, and SW26, and oscillating switch SW25 during a T4 time period, the charged electrode is discharged through the damping resistor 32 and the inductor 52, which is included in the discharge loop according to this aspect of the invention. By repeatedly changing the switching states of the switches SW21–36 according to TABLE 3, the inverter circuit according to this embodiment of the invention produces a drive signal having a waveform substantially similar to the waveform shown in FIG. 6.

Figure 6:
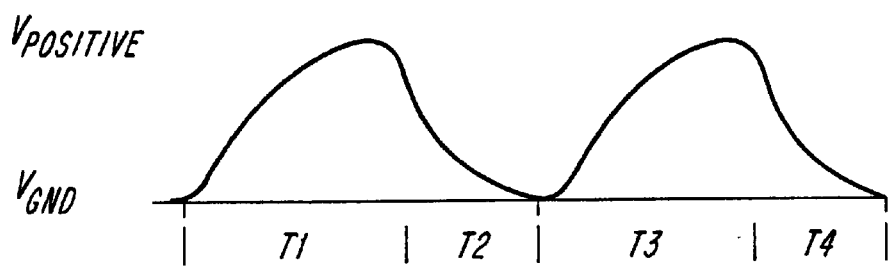
FIG. 6 shows a timing diagram of an AC drive signal produced by the inverter circuit of FIG. 5.

According to another aspect of the present invention, a pulse width modulator (PWM) circuit 74 controls the switching states of the switches SW26 and SW25. The duty cycle of the PWM circuit 74 may be controlled by the control logic circuit 66, to control the charge and discharge rate of the electroluminescent lamp 14. Through such control, the inverter circuit of FIG. 5 can generate a drive signal preferably having a sinusoidal characteristic as shown in FIG. 6. For example, the switch SW 26 may be opened and closed to incrementally pump charge current into the electroluminescent lamp at a rate that corresponds to a predefined switching duty-cycle. Similarly, the switch SW25 may be opened and closed according to the same or another predefined duty-cycle, to remove the charge stored in the electroluminescent lamp 14. By properly controlling the switching duty-cycles during the charge and discharge cycles, the inverter circuit according to this aspect of the present invention can generate a substantially sinusoidal drive signal across the electroluminescent lamp 14.

In yet another embodiment of the inverter circuit of FIG. 5, discharging the electroluminescent lamp may be controlled by two switches SW27 and SW28 (as shown in dotted lines), instead of the switch SW25. According to this arrangement, the common node 62 is grounded (as shown in dotted line) and a common node 72 of the switches SW27 and SW28 is connected to the damping resistor 32. Under this arrangement, during the charge cycles both of the switches SW27 and SW28 are open, to charge a corresponding electrode. During the discharge cycle, one of the switches SW27 or SW28 that is connected to the charged electrode of the electroluminescent lamp is closed while the other is open, to discharge the electrode.

Figure 7:
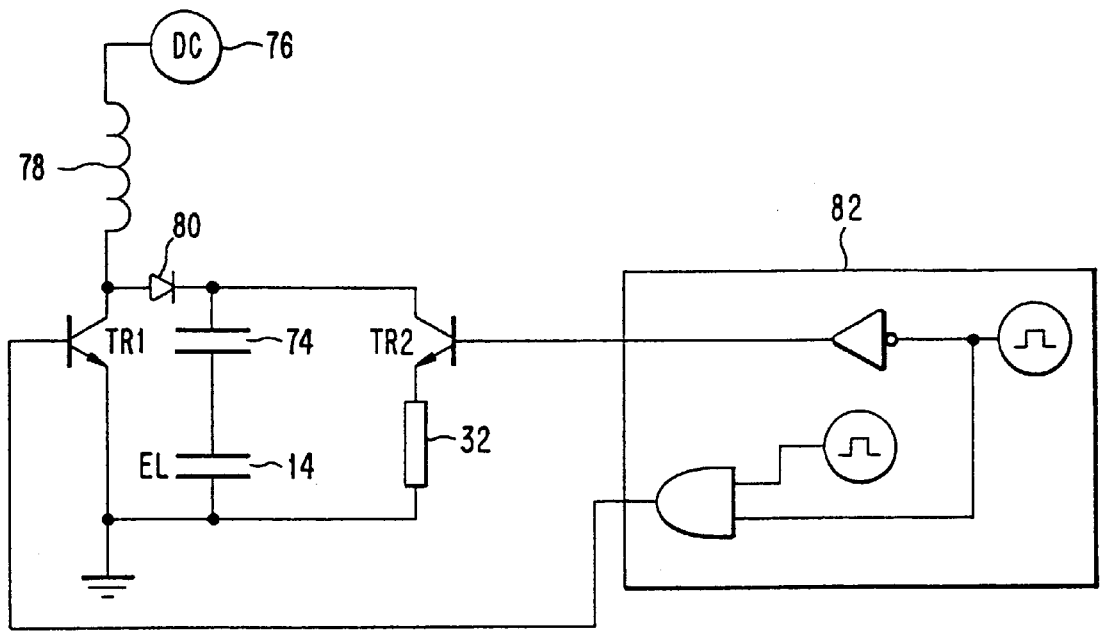
FIG. 7 is a schematic diagram of still another embodiment of the inverter circuits according to the present invention.

With reference to FIG. 7, still another embodiment of the inverter circuits according to the present invention is shown. According to this embodiment, the inverter improves the humming noise caused by the mechanical movements associated with the chassis of the electronic device. This humming noise is generated when only one of the electrodes of the electroluminescent lamp is charged, for example, a rear electrode of the electroluminescent lamp, which is positioned toward a printed circuit board. The humming noise caused by this condition is improved by connecting a front transparent electrode of the electroluminescent lamp 14 to ground, while connecting the other electrode to a diode 80 through a substantially large capacitor 74, which is approximately 100 times the value of the electroluminescent lamp. The combination of the large capacitor 74 and the electroluminescent lamp 14 produces a voltage divider network that provides a large portion of the developed potential across the electroluminescent lamp. This divider voltage network reduces electroluminescent lamp's current leakage, which damages the electroluminescent lamp in the long term. Under this arrangement, the electroluminescent lamp is preferably connected to ground because the lamp's bias voltage will be better centralized.

According to this embodiment, the inverter circuit of FIG. 7 includes a power supply 76 that charges the electroluminescent lamp 14 through a charging inductor 78 and diode 80. A first transistor switch TR1, which is controlled by a fast oscillating device opens and closes at a high frequency. By turning ON and OFF the first transistor switch TR1 at the high frequency, the electroluminescent lamp is charged through the inductor 78 as described before. A control logic circuit 82 controls the operation of this embodiment of the inverter circuit according to Table 4.

TABLE 4

|    | TR1  | TR2    |
|----|------|--------|
| T1 | OSC  | OPEN   |
| T2 | OPEN | CLOSED |

Operationally, during a first switching state during a T1 time period, the transistor switch TR1 oscillates to charge the electroluminescent lamp, while the second transistor switch TR2 remains open. Once the electroluminescent lamp is charged, the first transistor switch TR1 opens during a second switching state that takes place during a second time period T2. During the T2 time period, the charged electrode of the electroluminescent lamp is discharged through the damping resistor 32 by closing the second transistor switch TR2. According to this embodiment, the inductor 78 is included in the discharge loop of the electroluminescent lamp 14 during the discharge cycle. Similar to the inverter circuit of the FIG. 5 the drive signal for driving the electroluminescent lamp under this embodiment can be controlled by a phase width modulator to provide the sinusoidal characteristic shown in FIG. 6.

Figure 8:
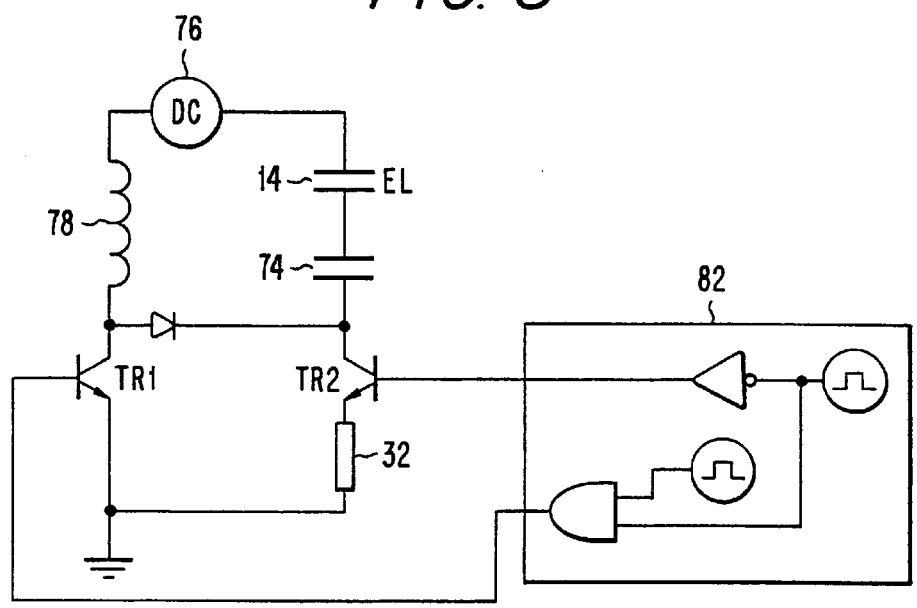
FIG. 8 is a schematic diagram of one more embodiments of the inverter circuit according to the present invention.
Figure 9:
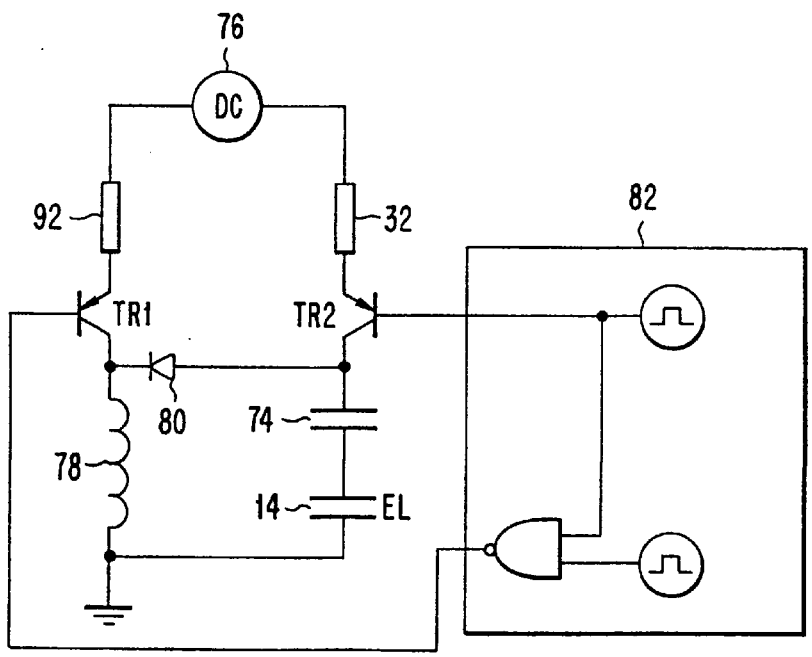
FIG. 9 is a schematic diagram of yet one more embodiments of the inverter circuit according to the present invention.

FIGS. 8 and 9 show two more embodiments of the inverter circuit according to the present invention, which operate similar to the inverter circuit of FIG. 7. Under the configuration of FIG. 8, the front transparent electrode of the electroluminescent lamp 14 is coupled to the supply voltage 76 and the rear electrode to the large capacitor 74, which is approximately 100 times the value of the electroluminescent lamp 14. Under the configuration of FIG. 9, the driver curve is the same expect that the inductor 78 charges the electroluminescent lamp 14 negatively instead of positively. Preferably, the charge electrode of the electroluminescent lamp 14, either negatively or positively, is mechanically firm, to prevent the induction of noise caused by surrounding vibrations.

Similar to the inverter circuit of FIG. 7, the inverter circuits of FIGS. 8 and 9 produce voltage dividers which apply substantially higher supply voltage across the electroluminescent lamp 14. In this way, the capacitor 74 prevents current leakage and adverse variations of the supply voltage which otherwise would decrease the lifetime of the electroluminescent lamp 14. As described before, the damping resistor 32 prolongs the discharge cycle, to improve the humming noise and the lifetime of the electroluminescent lamp 14. As shown in FIG. 8, by placing the resistor between the emitter of the TR2 and ground, a constant current source is created, which gives a linear discharge curve. The control logic circuit 82 controls the operation of this embodiment of the inverter circuit according to Table 4. Moreover, in response to the supply voltage variations, for example, those resulting from a discharged battery, the duty cycle of the TR1 may be controlled in order to maintain a constant luminance across the electroluminescent lamp 14. In addition to reducing humming noise caused by the mechanical movements associated with the chassis of the electronic device, these embodiments of the invention allow for the control of supply voltage, for increasing the lifetime of the electroluminescent lamp 14. FIG. 9 also shows a resistor 92 for handling supply voltage variations by duty cycle change of TR1.

According to this aspect of the invention, by adjusting the value of the capacitor 74, the luminance provided by the electroluminescent lamp 14 can also be adjusted. As it is well known, the luminance of the electroluminescent lamp 14 corresponds to the rate of voltage change, (dV/dt), across it. That is, the faster the discharge rate the more the luminance and vice versa. Furthermore, by changing the value of the damping resistor 32, the discharge rate may be changed. Thus, the luminance can be adjusted by varying the values of the damping resistor 32 and the capacitor 74. Consequently, according to this aspect of the invention a balance may be reached between the luminance provided the electroluminescent lamp 14 and the reduction in humming noise.

From the foregoing description, it would be appreciated that the different embodiments of the inverter circuit according to the various aspects of the present invention reduce irritating humming noise components by prolonging drive signal transitions during the discharge cycles. By suitably programming the control logic or the PWM circuit to couple a damping discharge circuit across the electroluminescent lamp, the inverter circuit of the present invention can be used in small electronic devices without producing the undesired humming noise components that are generated by conventional inverter circuits, while increasing the operating life of the electroluminescent lamp.

Although the invention has been described in detail with reference only to the presently preferred embodiments, those skilled in the art will appreciate that various modifications can be made without departing from the invention. Accordingly, the invention is defined only by the following claims which are intended to embrace all equivalents thereof.

What is claimed is:

1. An apparatus for illuminating an electroluminescent lamp during repetitive illumination cycles, comprising:
    a charge circuit coupled to a DC power supply that charges the electroluminescent lamp to a first voltage level during a charge cycle; and
    a damping discharge circuit that discharges the electroluminescent lamp to a second voltage level during a discharge cycle, wherein the damping discharge circuit discharges the electroluminescent lamp to dampen a transition from the first voltage level to the second voltage level wherein the damping discharge circuit includes a resistor that is connected to the electroluminescent lamp and a fixed voltage during the discharge cycle.

2. The apparatus of claim 1, wherein the apparatus includes a single inductor.

3. The apparatus of claim 1, wherein an average voltage across the electroluminescent lamp is approximately equal to zero.

4. The apparatus of claim 1, wherein the fixed voltage is substantially equal to ground.

5. The apparatus of claim 1, wherein the transition from the first voltage level to the second voltage level is smooth during the discharge cycle.

6. The apparatus of claim 1, wherein each illumination cycle includes a positive charge cycle that charges the electroluminescent lamp to a voltage level that is positive with respect to an initial level and a negative charge cycle that charges the electroluminescent lamp to a voltage level that is negative with respect to the initial level.

7. The apparatus of claim 1, wherein the resistor is coupled across the electroluminescent lamp during the discharge cycle.

8. The apparatus of claim 2, wherein the charge circuit includes the inductor and a charge switch circuit for connecting and disconnecting the inductor to the DC power supply at a high frequency.

9. The apparatus of claim 8, wherein the damping discharge circuit includes a discharge switch circuit for connecting and disconnecting the damping discharge circuit to the electroluminescent lamp.

10. The apparatus of claim 9, wherein the inductor is included in the damping discharge circuit during the discharge cycle.

11. The apparatus of claim 9, wherein the charging and the charge switch circuit and the discharge switch circuit are controlled by a pulse width modulator.

12. An apparatus for illuminating an electroluminescent lamp during repetitive illumination cycles, comprising:
    a charge circuit coupled to a DC power supply that charges the electroluminescent lamp to a first voltage level during a charge cycle; and
    a damping discharge circuit that discharges the electroluminescent lamp to a second voltage level during a discharge cycle, wherein the damping discharge circuit discharges the electroluminescent lamp to dampen a transition from the first voltage level to the second voltage level, and wherein a voltage across the electroluminescent lamp is provided by a voltage divider including a capacitor having a capacitance substantially larger than the electroluminescent lamp.

13. The apparatus of claim 12, wherein the substantially larger capacitance of the capacitor is adjusted to control the luminescence of the electroluminescent lamp.

14. The apparatus of claim 1, wherein the value of the resistor is adjusted to control the luminescence of the electroluminescent lamp.

15. A method for operating an electroluminescent lamp, comprising:
    charging the electroluminescent lamp to a first voltage level during a charge cycle via a charge circuit coupled to a DC power supply;
    discharging the electroluminescent lamp via a discharge circuit to a second voltage level during a discharge cycle, wherein the discharge circuit includes a resistor that is connected to the electroluminescent lamp and a fixed voltage during the discharge cycle; and
    dampening the transition from the first voltage level to the second voltage level.

16. The method of claim 15, wherein the transition from the first voltage level to the second voltage level is smooth during the discharge cycle.

17. The method of claim 15, wherein the charge circuit and the discharge circuit collectively include a single inductor.

18. The method of claim 15, wherein an average voltage across the electroluminescent lamp is approximately equal to zero.

19. An apparatus for operating an electroluminescent lamp, comprising:
    means for charging the electroluminescent lamp to a first voltage level during a charge cycle;
    means for discharging the electroluminescent lamp to a second voltage level during a discharge cycle; and
    means for dampening the transition from the first voltage level to the second voltage level wherein the means for dampening includes a resistor that is connected to the electroluminescent lamp and a fixed voltage during the discharge cycle.

20. The apparatus of claim 19, wherein the transition from the first voltage level to the second voltage level is smooth.

21. The apparatus of claim 19, wherein the apparatus includes a single inductor.

22. The apparatus of claim 19, wherein an average voltage across the electroluminescent lamp is approximately equal to zero.

23. A portable communication device, comprising:

an electroluminescent lamp;

an inverter circuit for illuminating the electroluminescent lamp during repetitive illumination cycles;

a DC power supply;

a charge circuit coupled to the DC power supply that charges the electroluminescent lamp to a first voltage level during a charge cycle; and a damping discharge circuit that discharges the electroluminescent lamp to a second voltage level during a discharge cycle, wherein the damping discharge circuit discharges the electroluminescent lamp to dampen a transition from the first voltage level to the second voltage level and wherein the damping discharge circuit includes a resistor that is connected to the electroluminescent lamp and a fixed voltage during the discharge cycle.

24. The portable communication device of claim 23, wherein the transition from the first voltage level to the second voltage level is smooth during the discharge cycle.

25. The portable communication device of claim 24, wherein the charge circuit and the damping discharge circuit collectively include a single inductor.

26. The portable communication device of claim 23, wherein an average voltage across the electroluminescent lamp is approximately equal to zero.

27. The portable communication device of claim 26, wherein the fixed voltage is substantially equal to ground.

28. The portable communication device of claim 23, wherein each illumination cycle includes a positive charge cycle that charges the electroluminescent lamp to a voltage level that is positive with respect to an initial level and a negative charge cycle that charges the electroluminescent lamp to a voltage level that is negative with respect to the initial level.

29. The portable communication device of claim 23, wherein the resistor is coupled across the electroluminescent lamp during the discharge cycle.

30. The portable communication device of claim 23, wherein the charge circuit includes an inductor and a charge switch circuit for connecting and disconnecting the inductor to the DC power supply at a high frequency.

31. The portable communication device of claim 30, wherein the discharge circuit includes a discharge switch circuit for connecting and disconnecting the damping discharge circuit to the electroluminescent lamp.

32. The portable communication device of claim 31, wherein the inductor is included in the damping discharge circuit during the discharge cycle.

33. The portable communication device of claim 31, wherein the charging and the charge switch circuit and the discharge switch circuit are controlled by a pulse width modulator.

34. The portable communication device of claim 23, wherein the voltage across the electroluminescent lamp is provided by a voltage divider including a capacitor having a capacitance substantially larger than the electroluminescent lamp.

35. The portable communication device of claim 34, wherein the substantially larger capacitance of the capacitor is adjusted to control the luminescence of the electroluminescent lamp.

36. The portable communication device of claim 23, wherein the value of the resistor is adjusted to control the luminescence of the electroluminescent lamp.

37. The apparatus of claim 19, wherein the resistor is coupled across the electroluminescent lamp during the discharge cycle.

38. The apparatus of claim 19, wherein the fixed voltage is substantially equal to ground.

39. The apparatus of claim 5, wherein the charging and the charge switch circuit are controlled by a pulse width modulator.

40. The portable communication device of claim 24, wherein the charging and the charge switch circuit are controlled by a pulse width modulator.

* * * * *